United States Patent
Jain et al.

(10) Patent No.: US 10,318,940 B2
(45) Date of Patent: Jun. 11, 2019

(54) SYSTEM AND METHOD FOR PROVIDING PERSONALIZED CUSTOMER ASSISTANCE USING A FINANCIAL CARD HAVING AN RFID DEVICE

(75) Inventors: Chitra Jain, Glen Allen, VA (US); Roy E. Lowrance, Washington, DC (US); Gregor S. Bailar, McLean, VA (US); Daniel R. Swanson, Sr., Midlothian, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 2162 days.

(21) Appl. No.: 10/824,178

(22) Filed: Apr. 14, 2004

(65) Prior Publication Data

US 2005/0234769 A1  Oct. 20, 2005

(51) Int. Cl.
*G06Q 20/12* (2012.01)
*G06Q 30/02* (2012.01)

(52) U.S. Cl.
CPC ............. *G06Q 20/12* (2013.01); *G06Q 30/02* (2013.01); *G06Q 30/0215* (2013.01); *G06Q 30/0224* (2013.01); *G06Q 30/0226* (2013.01)

(58) Field of Classification Search
CPC ...................................................... G06Q 30/02
(Continued)

(56) References Cited

U.S. PATENT DOCUMENTS 5,887,271 A  3/1999 Powell ............................. 705/14
6,039,244 A *  3/2000 Finsterwald .................. 235/375
(Continued)

FOREIGN PATENT DOCUMENTS

WO  WO 97/24689  7/1997
WO  WO 03/058391  7/2003

OTHER PUBLICATIONS

Spartan Internet, "You Need More Than Just a Shopping Cart," StartMyStore.com: Easily Create Your Online Store Today URL:http://www.startmystore.com/prices.htm, pp. 1-4, 2002-2003.
(Continued)

*Primary Examiner* — Arthur Duran
(74) *Attorney, Agent, or Firm* — Troutman Sanders LLP; Christopher J. Forstner; John A. Morrissett (57) ABSTRACT

According to one embodiment, a method of providing personalized customer service is provided. The method includes receiving purchase information from purchases made from a merchant using a financial card affiliated with the merchant. The financial card has an associated financial account and an RFID device coupled thereto. The RFID device stores identification data identifying the customer and/or the financial account. The purchase information includes an identification of items purchased during the purchases. The method further includes causing the received purchase information to be stored in storage separate from the card as purchase history information associated with the financial account. The method includes reading the identification data from the RFID device using an RFID reading device, identifying the financial account based on the identification data, and retrieving from storage the stored purchase history information associated with the identified financial account. The method further includes providing personalized service to the customer tailored to the purchase history information associated with the identified financial account.

24 Claims, 3 Drawing Sheets

(58) Field of Classification Search
USPC .......................................................... 705/14
See application file for complete search history.

(56) References Cited

U.S. PATENT DOCUMENTS

| | | | | |
|---|---|---|---|---|
| 6,123,259 | A | 9/2000 | Ogasawara | 235/380 |
| 6,233,564 | B1* | 5/2001 | Schulze, Jr. | 705/14.19 |
| 6,386,450 | B1 | 5/2002 | Ogasawara | 235/383 |
| 6,422,464 | B1* | 7/2002 | Terranova | 235/384 |
| 6,535,132 | B2 | 3/2003 | Waters et al. | 340/573.1 |
| 6,587,835 | B1* | 7/2003 | Treyz et al. | 705/14.64 |
| 7,580,856 | B1* | 8/2009 | Pliha | 705/14.26 |
| 2002/0091562 | A1* | 7/2002 | Siegel et al. | 705/10 |
| 2002/0147642 | A1 | 10/2002 | Avallone et al. | 705/14 |
| 2002/0156677 | A1 | 10/2002 | Peters et al. | 705/14 |
| 2002/0165758 | A1 | 11/2002 | Hind et al. | 705/10 |
| 2002/0174025 | A1 | 11/2002 | Hind et al. | 705/26 |
| 2002/0179703 | A1 | 12/2002 | Allen | 235/381 |
| 2002/0198803 | A1* | 12/2002 | Rowe | 705/35 |
| 2003/0105689 | A1* | 6/2003 | Chandak et al. | 705/35 |
| 2003/0167206 | A1* | 9/2003 | Shirai | 705/16 |
| 2003/0177058 | A1* | 9/2003 | Needham | 705/10 |
| 2004/0029569 | A1 | 2/2004 | Khan et al. | |
| 2004/0039639 | A1* | 2/2004 | Walker et al. | 705/14 |
| 2004/0093265 | A1* | 5/2004 | Ramchandani et al. | 705/14 |
| 2004/0215517 | A1* | 10/2004 | Chen et al. | 705/14 |
| 2004/0267676 | A1* | 12/2004 | Feng et al. | 705/400 |
| 2005/0251440 | A1* | 11/2005 | Bednarek | 705/10 |
| 2007/0143171 | A1* | 6/2007 | Boyd et al. | 705/10 |

OTHER PUBLICATIONS

American Express, "ShopAmex Store Details," pp. 1-2, URL:http://www01.extra.americanexpress.com/StoreDetails.aspx?merchantid=2087, 2000.

Fickel, L., CIO.com, "Power to the People," pp. 1-7, URL:http://www.cio.com/archive/081500/power.html, Aug. 15, 2000.

Kiosk News, Kiosk Marketplace.com, "Target to Roll Out Loyalty Program in Q3," pp. 1-2, URL:http://www.kioskemarketplace.com.news_story.htm?i=15963, Jun. 19, 2003.

Robin Clark/The Wise Marketer.com, "Loyalty Scheme to Use RFID for Personal Service," pp. 1-3, URL:http://www.kiosks.org/articles/pr050303a.html, Mar. 31, 2003.

Maselli, J., RFID Journal, Texas Instruments Incorporated, "RFID Aids the Customer Experience," pp. 1-2, URL:http://www.ti.com/tiris/docs/news/in_the_news/2003/6-27-03.shtml, Jun. 27, 2003.

* cited by examiner

SYSTEM AND METHOD FOR PROVIDING PERSONALIZED CUSTOMER ASSISTANCE USING A FINANCIAL CARD HAVING AN RFID DEVICE

TECHNICAL FIELD OF THE INVENTION

This invention relates in general to customer assistance and, more particularly, to a system and method for providing personalized customer assistance using information obtained from a financial card having an RFID device.

BACKGROUND OF THE INVENTION

Retail customers often frequent stores in which they are likely to receive personalized customer service. In nearly all retail outlets, a customer is unknown to the clerk or customer service representative serving them until the customer makes his or her purchase, at which time the clerk or cashier may learn the customer's name from the customer's credit or debit card. When a retailer is able to engage its customers more personally, the customers are likely to spend more time and money with the retailer. This increase in sales may occur during the present transaction as well as encourage future purchases from the retailer.

SUMMARY OF THE INVENTION

In accordance with the present invention, systems and methods for providing personalized customer assistance using information obtained from a financial card having an RFID device. According to one embodiment, a method of providing personalized customer service is provided. The method includes receiving purchase information from purchases made from a merchant using a financial card affiliated with the merchant. The financial card has an associated financial account and an RFID device coupled thereto. The RFID device stores identification data identifying the customer and/or the financial account. The purchase information includes an identification of items purchased during the purchases. The method further includes causing the received purchase information to be stored in storage separate from the card as purchase history information associated with the financial account. The method includes reading the identification data from the RFID device using an RFID reading device, identifying the financial account based on the identification data, and retrieving from storage the stored purchase history information associated with the identified financial account. The method further includes providing personalized service to the customer tailored to the purchase history information associated with the identified financial account.

According to another embodiment, another method of providing personalized customer service is provided. A financial card issuer provides a customer with a financial card having an RFID device coupled thereto. The financial card is affiliated with a merchant and has an associated financial account. The RFID device stores identification data identifying the customer and/or the financial account. The financial card issuer receives purchase information from one or more purchases made from the merchant using the financial card. The purchase information includes an identification of items purchased during the one or more purchases. The received purchase information is stored in storage separate from the card as purchase history information associated with the financial account. The financial card issuer periodically communicates the stored purchase history information to the merchant such that the merchant may provide personalized service to the customer tailored to the purchase history information associated with the identified financial account in response to the RFID device being detected and identified as being associated with the financial account.

Various embodiments of the present invention may benefit from numerous advantages. It should be noted that one or more embodiments may benefit from some, none, or all of the advantages discussed below.

One advantage of the invention is that personalized customer service may be provided to customers carrying RFID cards. A customer carrying such an RFID card tied to a financial account (such as a credit or debit account) may tap the card against an RFID reader at a merchant of customer service area, which may retrieve information regarding the past purchases by the customer from the merchant. A customer service representative may then assist the customer based on information regarding the customer, such as the customer's name and past purchases. For example, the customer service representative may use the customer's name and may help the customer identify which items to purchase for a particular project, and may help the customer locate and collect the items. In addition, the merchant may provide the customer financial incentives to use the RFID card to make purchases from the merchant rather than from another merchant, such as a competitor. The merchant may provide the customer financial rewards for making such purchases, such as using a system of loyalty points. Thus, customers may wish to use such RFID cards rather than other cards to make purchases from the merchant, which may be financially advantageous to both the entity that maintains the account tied to the RFID card, as well as the merchant. In addition, the RFID card may also provide the customer benefits such as instant coupons and customized specials based on the customer's past purchase patterns.

Other advantages will be readily apparent to one having ordinary skill in the art from the following figures, descriptions, and claims.

BRIEF DESCRIPTION OF THE DRAWINGS

For a more complete understanding of the present invention and for further features and advantages, reference is now made to the following description, taken in conjunction with the accompanying drawings, in which.

DETAILED DESCRIPTION OF THE DRAWINGS

Example embodiments of the present invention and their advantages are best understood by referring now to FIGS. 1 through 4 of the drawings, in which like numerals refer to like parts.

Figure 1:
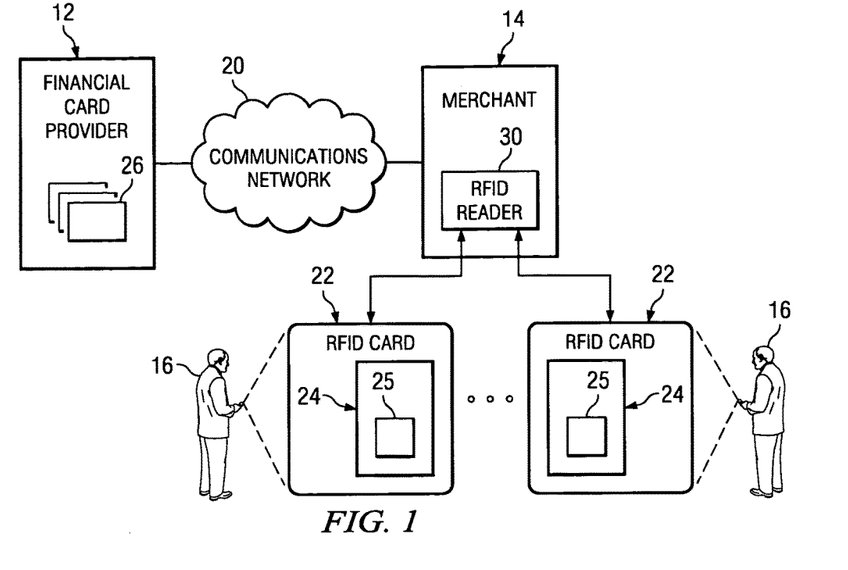
FIG. 1 illustrates an example system for providing personalized customer assistance using information obtained from a financial card having an RFID device in accordance with an embodiment of the invention.

FIG. 1 illustrates an example system 10 for providing personalized customer assistance using information obtained from a financial card having a radio frequency identification (RFID) device in accordance with an embodiment of the invention. System 10 includes a financial card provider 12, a merchant 14, and a plurality of account holders, or cardholders, 16. Various components of system 10 may be coupled to each other by a communications network 20. For example, in the embodiment shown in FIG. 1, financial card provider 12 and merchant 14 are coupled to each other by communications network 20.

Generally, financial card provider 12 and merchant 14 cooperate to provide personalized customer assistance to customers 16 based on information obtained from financial cards having an RFID device attached thereto. For example, the financial card provider 12 may be a credit card issuer that provides a customer 16 a credit card 22 having an RFID device 24 attached thereto, which card may be referred to as an RFID credit card 22. The RFID credit card 22 has an associated credit card account 26 maintained by credit card provider 12 and may or may not be affiliated with the merchant 14, such as a department store credit card, for example. The RFID credit card 22, which may be an RFID tag, for example, stores a unique identification code which may be used to identify the RFID credit card 22 from other RFID cards or tags. The RFID credit card 22 may also store information identifying the customer 14 and/or the credit account 26, such as a customer ID number or an account number, for example. Each time the customer 16 makes purchases from merchant 14 using RFID credit card 22, purchase information such as a listing of each item and the cost of each item purchased is recorded in connection with the credit account. When the customer 16 enters the merchant's premises or store to make subsequent purchases, she may tap the RFID credit card 22 on a designated spot, such as on a kiosk, bar or sign, which may contain an RFID reading device 30, such as an RFID tag reader. The RFID reading device 30 and associated electronics may read the identification code and/or other information from the RFID device 24 on RFID credit card 22 and identify the credit account 26, the customer's name, and the recorded purchase history information associated with the credit account 26. Based on this purchase history information, merchant 14 may then provide the customer 16 personalized customer service. For example, a customer service representative of merchant 14 may engage the customer 16 using the customer's name 16. As another example, the customer service representative may help the customer 16 determine what items the customer 16 will want to purchase as well assistance with locating and collecting those items for the customer 16. In addition, merchant 14 may provide the customer 16 a financial reward based on past purchases made by the customer 16. Further, the merchant may print out personalized instant coupons or personalized advertised specials for that day or for future dates.

Financial card provider 12 may include any entity suitable for providing a customer a financial card having an RFID device 24 attached thereto, which may be referred to as an RFID card 22, and maintaining a financial account 26 associated with such an RFID card 22 for the customer 16. For example only and not by way of limitation, financial card provider 12 may in particular embodiments include a bank, a credit union, or a credit card issuer. Financial card provider 12 is described in greater detail below with reference to FIGS. 2 and 3. A financial account 26 may be a credit card account, a debit account, or any other suitable type of account that may be maintained by financial card provider 12.

An RFID card 22 may be any card or other item having an RFID device 24 attached thereto. The RFID device 24 may be attached to the card 22 in any suitable manner, such as being externally affixed to one side of the card 22 or embedded within the card 22, for example. The RFID device 24 may be an RFID tag and may include one or more RFID transmitters, RFID receivers, RFID transceivers, antennae, integrated circuits, memory and/or any other suitable components as known by those skilled in the art of RFID devices. Each RFID device 24 associated with a merchant 14 may have different or unique identification data 25 which may be used to identify the account 26 corresponding with the RFID card 22. Thus, each RFID device 24 may be identified and distinguished from other RFID devices 24. The identification data may include one or more types of codes, such as a version number, a domain manager, a class code and/or a serial number. For example, in one embodiment, the identification code of each RFID device 24 is a 96-bit code. In addition, the identification data 25 may include the customer's name, which may be read and used by a customer service representative of merchant 14 to engage the customer 16 more personally, as described below. Although RFID card 22 is referred to herein as a "card," an RFID card 22 may be any item having an RFID device 24 coupled thereto, such as described above. For example, RFID card 22 may be a key fob or disk having an RFID device 24 coupled thereto.

An RFID card 22 may be any of a variety of types of cards having an associated account, such as a store affinity card or a loyalty card specific to a particular merchant 14, a general credit card (such as a VISA™ or MASTERCARD™, for example), a credit card having an affiliation to a particular merchant 14 (such as a Lowes credit card, for example), a debit card, or a hybrid credit/debit card, for example. A customer 16 may be any new, existing or potential customer of merchant 14 suitable to receive and use an RFID card 22.

Merchant 14 may include any entity suitable to accept payment from a financial card, such as an RFID credit card 22 or an RFID debit card 22, in exchange for various products or services. Merchant 14 may include a single entity (such as, for example, an individual store) or a number of entities (such as, for example, a chain of stores). Merchant 14 may include a seller or distributor that sells items produced by one or more otherwise unaffiliated producers. In addition or as an alternative, merchant 14 may include a producer that sells one or more items it produces directly to debit card holders, bypassing distributors. Although merchant 14 is described as selling items to debit card holders, the present invention, as described above, contemplates any suitable transactions between merchant 14 and debit card holders. As an example, merchant 14 may rent one or more items to debit card holders. As another example, merchant 14 may include an entity which provides services in exchange for payment from a debit card, such as a barber or auto mechanic, for example.

Communications network 20 may, in particular embodiments, include one or more local area networks (LANs), metropolitan area networks (MANs), wide area networks (WANs), portions of the Internet, or any other appropriate wireline, optical, wireless, or other links. Although FIG. 1 illustrates communication between financial card provider 12 and merchant 14 via communications network 20, the present invention contemplates any suitable form of communication between such entities. For example, financial card provider 12 and merchant 14 may communicate by telephone or carrier mail.

Figure 2:
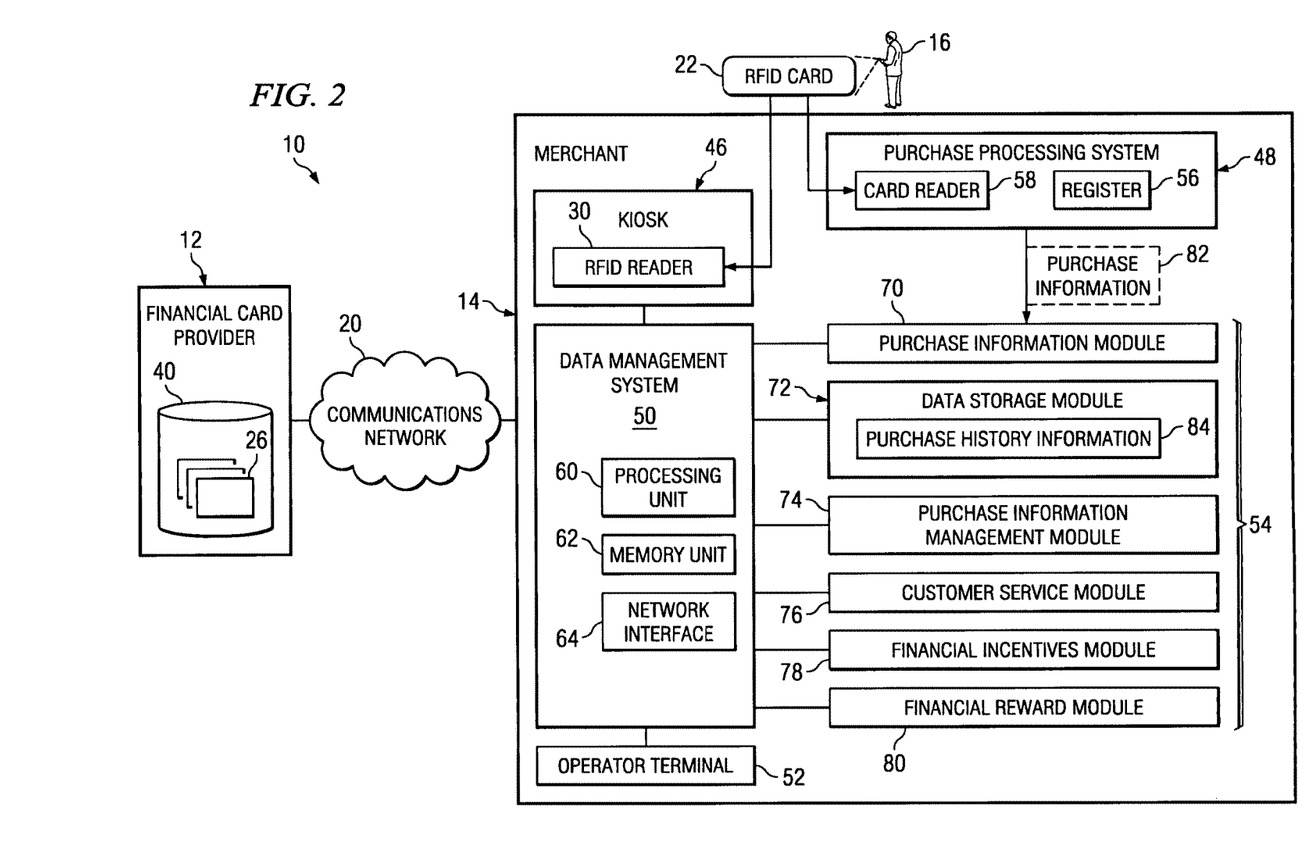
FIG. 2 illustrates a financial card provider and merchant of the system of FIG. 1 in accordance with one embodiment of the invention.

FIG. 2 illustrates financial card provider 12 and merchant 14 in accordance with one embodiment of the invention. According to the illustrated embodiment, financial card provider 12 includes an account database 40 which stores account information regarding various financial accounts 26, each associated with one or more RFID cards 22. As discussed above, financial card provider 12 is coupled to merchant 14 via communications network 20.

In this embodiment, merchant 14 includes a kiosk 46, a purchase processing system 48, a data management system 50, one or more operator terminals 52 and a number of function modules 54. The components of merchant 14 may be located at one or more sites and may be coupled to each other using one or more links, each of which may include some or all of a computer bus, local area networks (LANs), metropolitan area networks (MANs), wide area networks (WANs), portions of the Internet, a public switched telephone network (PSTN), any other appropriate wireline, optical, wireless, or other suitable communication link, or any combination of the preceding.

Kiosk 46 may include one or more RFID reading devices 30, such as described above regarding FIG. 1. Kiosk 46 may be a customer service kiosk or a stand-alone kiosk. In one embodiment, kiosk 46 may be located at or near a customer service counter or area provided by merchant 14. In alternative embodiments, kiosk 46 may merely be a bar or sign, including one or more RFID reading devices 30, against which a customer 16 may tap or swipe an RFID card 22.

In another embodiment, one or more RFID reading devices 24 may be positioned at merchant 14 such that the RFID reading devices 24 may automatically detect an RFID card 22 when the RFID card 22 enters the premises of merchant 14 or other particular area. Thus, the customer 16 may not have to tap or otherwise interface her RFID card 22 against an RFID reading device 24, such as an RFID reading device 24 at a kiosk.

Purchase processing system 48 may include any devices operable to receive a payment from an RFID card 22. For example, in the embodiment shown in FIG. 2, purchase processing system 48 includes a cash register 56 and a financial card reader 58. Financial card reader 58 may include any device operable to read a financial card, such as a credit card reader, a debit card reader, or a combined credit/debit card reader for example. It should be understood that purchase processing system 48 may include any other devices suitable for processing a payment from an RFID card 22.

An operator terminal 30 may provide an operator, such as a store clerk, manager, or customer service personnel, for example, with access to data management system 50 to configure, manage, or otherwise interact with data management system 50. An operator terminal 30 may include a computer system. As used in this document, the term "computer" refers to any suitable device operable to accept input, process the input according to predefined rules, and produce output, for example, a personal computer, workstation, network computer, wireless data port, wireless telephone, personal digital assistant, one or more processors within these or other devices, or any other suitable processing device.

Data management system 50 may manage data associated with customers 16 and/or RFID cards 22 (such as purchase history information stored in data storage module 84 discussed below, for example), which may in particular embodiments include creating, modifying, and deleting data files associated with customers 16, RFID cards 22 or accounts 26 automatically or in response to data received from RFID reading devices 30, purchase processing system 48, operator terminals 52 or function modules 54. Additionally, data management system 50 may call the one or more function modules 54 to provide particular functionality according to particular needs, as described more fully below. Data management system 50 may include a data processing unit 60, a memory unit 62, a network interface 64, and any other suitable components for managing data associated with customers 16, RFID cards 22 and/or accounts 26. The components of data management system 50 may be supported by one or more computer systems at one or more sites. One or more components of data management system 50 may be separate from other components of data management system 50, and one or more suitable components of data management system 50 may, where appropriate, be incorporated into one or more other suitable components of data management system 50.

Data processing unit 60 may process data associated with customers 16 and/or RFID cards 22, which may include executing coded instructions that may in particular embodiments be associated with the one or more function modules 54. Memory unit 62 may be coupled to data processing unit 60 and may include one or more suitable memory devices, such as one or more random access memories (RAMs), read-only memories (ROMs), dynamic random access memories (DRAMs), fast cycle RAMs (FCRAMs), static RAM (SRAMs), field-programmable gate arrays (FPGAs), erasable programmable read-only memories (EPROMs), electrically erasable programmable read-only memories (EEPROMs), microcontrollers, or microprocessors. Network interface 64 may provide an interface between data management system 52 and communications network 20 such that data management system 52 may communicate with financial card provider 12.

A function module 54 may provide particular functionality associated with merchant 14. As an example only and not by way of limitation, a function module 54 may provide functionality associated with providing RFID cards 22 to customers 16, enabling or activating RFID devices 24 on RFID cards 22, processing purchases made using RFID cards 22, receiving and managing purchase information, providing personalized customer service, and providing financial incentives and rewards to customers. A function module 54 may be called by data management system 50 possibly as a result of data received from an RFID reading device 30, an operator terminal 30 or another function module 54, for example. In response, the function module 54 may provide the particular functionality associated with the function module 54 and communicate one or more results to data processing unit 60 or one or more other suitable components of data management system 50. The communicated results may be used to create, modify, or delete one or more data files associated with one or more customers 16, RFID cards 22 and/or accounts 26, provide data to an operator at an operator terminal 30, or perform any other suitable task.

Function modules 54 are operable to perform various functions in the operation of the system 10. According to the embodiment shown in FIG. 2, function modules 54 include a purchase information module 70, a data storage module 72, a purchase information management module 74, a customer service module 76, a financial incentive module 78, and a financial reward module 80. Like data management system 50, function modules 54 may be physically distributed such that each function module 54 or multiple instances of each function module 54 may be located in a different physical location geographically remote from each other, from data management system 50, or even from merchant location 22. In addition, each function module 54 may be partially or completely integrated with other function modules 54 and/or with other components of tracking management system 26. For example, particular function modules 54 may include operator terminals 30 such that at least a portion of the functionality of such function modules 54 is provided by human operators. Thus it should be understood that the functionality provided by each function module 54 may be completely automated, partially automated, or completely human-controlled.

Purchase information module 70 may receive purchase information 82 from purchase processing system 48 for purchases made by a customer 16 using an RFID card 22. For each transaction, purchase information 82 may include information identifying the RFID card 18 or the corresponding account 26, an identification of each item purchased, the cost of each item purchased, the total cost of the transaction, any discounts, rebates or coupons used, and any other relevant information regarding the transaction. The information identifying the RFID card 18 may include information read from the RFID card 18, such as identification information 25, or traditional information identifying a financial card, such as a credit card or debit card account number, for example.

Purchase information module 70 may communicate such purchase information 82 to data storage module 72 for storage. Data storage module 72 may store the purchase information 82 regarding the RFID card 18 or the corresponding account 26 as purchase history information 84 linked to that RFID card 18 or corresponding account 26. Data storage module 72 may include one or more databases which may include any suitable memory devices, such as one or more random access memories (RAMs), read-only memories (ROMs), dynamic random access memories (DRAMs), fast cycle RAMs (FCRAMs), static RAM (SRAMs), field-programmable gate arrays (FPGAs), erasable programmable read-only memories (EPROMs), electrically erasable programmable read-only memories (EEPROMs), microcontrollers, or microprocessors. Data storage module 72 may be separate from or partially or completely integrated with memory unit 62 of data management system 50.

Purchase information management module 74 may be operable to receive identification information 25 read by an RFID reading device 30, identify the corresponding RFID card 22 and/or financial account 26 based on the identification data 30, and retrieve from data storage module 72 stored purchase history information 84 associated with the identified RFID card 22 and/or financial account 26. For example, if a customer 16 swipes his RFID card 22 against an RFID reader 30 at kiosk 46, the RFID reader 30 may read the identification information 25 stored on the RFID card 22 and communicate the identification information 25 to purchase information management module 74. Purchase information management module 74 may then communicate the identification information 25 to data storage module 72 in order to retrieve purchase history information 74 regarding the customer 16. Purchase information management module 74 may then provide this purchase history information 74 to other modules, such as customer service management module 76 or financial rewards module 80, for example, in order to provide various personalized services to the customer 16, as discussed below.

Customer service module 76 may provide personalized service to a customer 16 using an RFID card 22 tailored to the purchase history information 84 associated with that RFID card 22 or corresponding financial account 26. Customer service module 76 may receive purchase history information 84 for the customer 16 from data storage module 72 and/or purchase information management module 74 and offer or provide personalized service accordingly. In some embodiments, customer service module 76 may offer the customer 16 a discount, rebate, or coupon for particular items based on the items previously purchased or the amounts previously spent from merchant 14 by the customer 16. For example, customer service module 76 may offer the customer 16 a discount on a particular item if the customer 16 has purchased a particular quantity of that item in the past. As another example, customer service module 76 may help the customer 16 determine what items the customer 16 will need for a particular project (such as if the customer 16 has previously made purchases for a similar project). As yet another example, customer service module 76 may help the customer 16 locate particular items within the premises of merchant 14.

Customer service module 76 may be only partially automated such that a human agent of merchant 14, such as a manager or customer service employee, may assist the customer 16 based on information provided to the agent using computerized means. For example, customer service module 76 may generate a computer print-out of information regarding the customer 16, such as purchase history information 84 associated with the customer 16, which may be used by a human agent to help provide various types of personalized customer service to the customer 16 based on the print-out. A customer service representative of merchant 14 may engage the customer 16 using the customer's name 16 identified by the purchase history information 84. Alternatively, customer service module 76 may be fully automated such that a customer 16 may receive personalized customer service based on their purchase history information 84 without needing assistance from an agent of merchant 14. For example, customer service module 76 may generate a computer print-out for the customer 16 which may help the customer identify and locate particular items, identify potential discounts, rebates or coupons, or other personalized assistance. As another example, customer service module 76 may include a monitor or other visual interface such that the customer 16 may retrieve and view such customer service information directly.

Financial reward module 80 may provide various financial rewards to a customer 16 based on purchase history information 84 associated with a customer's RFID card 22 or corresponding financial account 26. In one embodiment, financial reward module 80 may award and manage loyalty points for a financial account 26 and offer or provide the corresponding customer 16 a financial reward based on the number of loyalty points awarded to the financial account. Financial reward module 80 may receive purchase history information 84 for an account 26 from data storage module 72 and determine the number of loyalty points to award the account 26. Financial reward module 80 may then cooperate with customer service module 76 to offer or provide the customer 16 financial rewards, such as discounts, rebates, or coupons, for example, based on the number of loyalty points awarded to account 26. In some embodiments, financial reward module 80 may offer the customer 16 a financial reward based on the items that the customer 16 has selected to purchase. For example, the customer 16 may select items to purchase, then tap or swipe her RFID card 18 against an RFID reading device 30 which may then employ various modules 54 to retrieve purchase history information 84 associated with the customer 16 (such as described above). Financial reward module 80 may then offer the customer 16 various financial rewards based on the selected items to be purchased and the purchase-history information 84 associated with the customer 16. Thus, a customer 16 may select items to be purchased and determine the potential rewards (such as discounts and rebates) that may be obtained by purchasing such items before actually purchasing the items.

Financial incentive module 82 may offer and provide a customer 16 a financial incentive for making purchases from merchant 14. For example, in some embodiments, RFID card 22 is affiliated with merchant 14 but may be used to make purchases from one or more other merchants, such as a VISA™ or MASTERCARD™ affiliated with a particular merchant 14. Financial incentive module 82 may offer customer 16 a financial incentive for purchasing items from merchant 14 rather than from another merchant, such as a competitor of merchant 14, for example.

Figure 3:
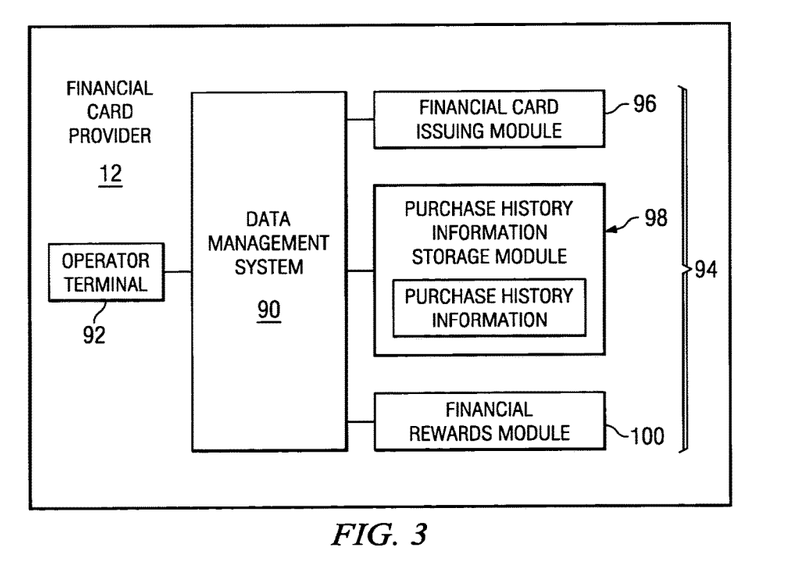
FIG. 3 illustrates a financial card provider in accordance with another embodiment of the invention.

FIG. 3 illustrates financial card provider 12 in accordance with another embodiment of the invention. In the embodiment shown in FIG. 3, much of the functionality that is provided by function modules 54 maintained by merchant 14 in the embodiment shown in FIG. 2 is provided instead by financial card provider 12. According to the embodiment of FIG. 3, financial card provider 12 includes a data management system 90, one or more operator terminals 92, and a number of function modules 94.

Data management system 90 and operator terminals 92 may be similar to data management system 50 and operator terminals 52, respectively, described above with regard to FIG. 2. In addition, function modules 94 may be similar to function modules 54 described above with regard to FIG. 2. In the embodiment shown in FIG. 3, function modules 94 include a financial card issuing module 96, a purchase history information storage module 98, and a financial rewards module 100.

Financial card issuing module 96 may provide customers 16 with RFID cards 22, such as by carrier mail, for example. Purchase history information storage module 98 may provide various functionality discussed above regarding purchase information module 70, data storage module 72, and purchase information management module 74 of the embodiment of FIG. 2. For example, when a customer 16 makes a purchase from merchant 14 using an RFID card 22, purchase processing system 48 or purchase information module 70 of merchant 14 (see FIG. 2) may communicate the received purchase information 82 to purchase history information storage module 98, such as via communications network 20. Purchase history information storage module 98 may receive and store this purchase information 82 as purchase history information 84 associated with the financial account 26 identified by the purchase information 82.

Purchase history information storage module 98 may manage such purchase history information 84 for various accounts 26 and periodically communicate such purchase history information 84 to merchant 14 (such as via communications network 20) such that merchant 14 may provide personalized customer service to customers 16 tailored to the purchase history information 84. For example, purchase history information storage module 98 may periodically communicate purchase history information 84 for various accounts 26 to data storage module 72 maintained by merchant 14. Customer service module 76 and financial reward module 78 of merchant 14 may then retrieve and use purchase history information 84 from data storage module 72 as described above with reference to FIG. 2. Thus, in some embodiments, financial card provider 12 may perform the management and analysis of purchase history information 84 for accounts 26, and then periodically update such information stored by merchant 14. The term "periodically" means occurring from time to time, which may or may not be at a constant frequency. For example only and not by way of limitation, purchase history information storage module 98 may communicate purchase history information 84 to merchant 14 each week or each month, when the customer 16 has made a particular number or dollar amount of purchases, or in response to a request from customer service module 76.

Financial rewards module 100 may be similar to financial rewards module 80 discussed above with reference to FIG. 2. For example, financial rewards module 100 may manage loyalty points for an account 26 earned by making purchases using an RFID card 22. Financial rewards module 100 may then communicate this information to merchant 14 such that the merchant 14 may provide the appropriate customer 16 a financial reward based on the number of loyalty points earned by that customer 16.

Other embodiments of system 10 may include various combinations and alternatives of the embodiments shown in FIGS. 2 and 3. For example, any of the functionality provided by various function modules 54 and 94 may be provided by either merchant 14 or financial card provider 12. In addition, particular functionality may be shared by merchant 14 and financial card provider 12, while other functionality may be performed redundantly by both merchant 14 and financial card provider 12.

Figure 4:
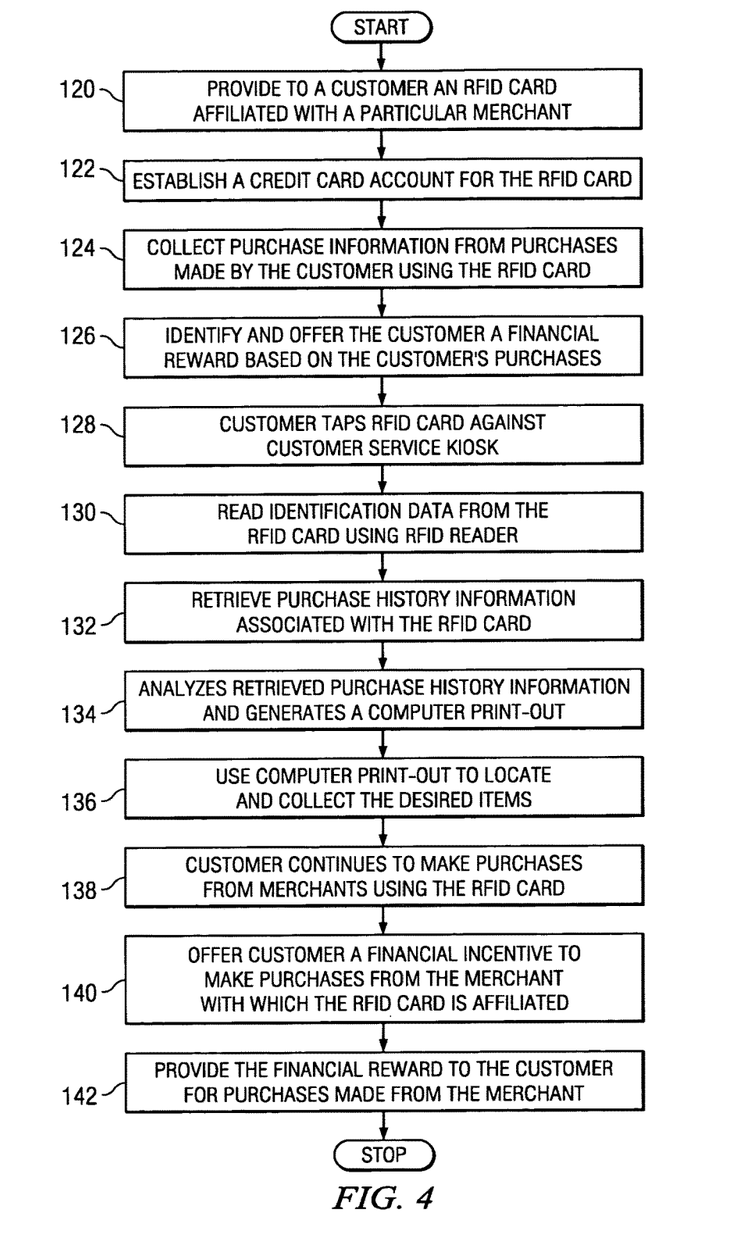
FIG. 4 illustrates an example method of providing personalized customer assistance to a customer using in accordance with the embodiment shown in FIG. 2.

FIG. 4 illustrates an example method of providing personalized customer assistance to a customer 16 using information obtained from an RFID card 22 in accordance with the embodiment shown in FIG. 2. At step 120, financial card provider 12 provides an RFID card 22 to a customer 16. In this embodiment, the RFID card 22 is a credit card affiliated with a particular merchant 14 but which may also be used to make purchases from other merchants. At step 122, financial card provider 12 establishes a credit card account 26 for RFID card 22. The RFID device 24 on the RFID card 22 stores an identification code 25 that identifies the RFID card 22 and credit card account 26.

At step 124, the customer makes purchases from merchant 14. For each purchase, various purchase information 82 is collected and stored by data storage module 72 as purchase history information 84. The purchase history information 84 is linked to the identification code 25 for the RFID card 22 and credit card account 26. Financial reward module 80 may determine whether the customer 16 has earned any financial rewards after each purchase. At step 126, financial reward module 80 determines that customer 16 has earned a financial reward—namely, a $10 discount on his next purchase of a particular item from merchant 14. The customer 16 purchases the particular item from merchant 14 and is awarded the $10 discount at the register.

At step 128, the customer 16 enters the store of merchant 14 wishing to purchase materials for a project for which customer 16 has purchased materials from merchant 14 in the past. Customer 16 walks up to the customer service kiosk 46 and taps her RFID card 22 against a designated spot which at which an RFID reader 30 is located. At step 130, the RFID reader 30 reads the identification data 25 from the RFID card 22 and communicates the identification data 25 to purchase information management module 74. At step 132, using the identification data 25, purchase information management module 74 retrieves from data storage module 72 the purchase history information 84 stored in association with the account 26 identified by identification data 25. At step 134, customer service module 76 analyzes the retrieved purchase history information 84 regarding RFID card 22 and generates a computer print-out of each of the items purchased by customer 16 using RFID card 22 in the last few years. At step 136, a customer service agent at the kiosk 46 receives the computer print-out and helps the customer 16 find the customer's past purchase of materials for the same project. The customer service representative may engage the customer 16 using the customer's name 16 identified by the purchase history information 84. The customer service agent may then help the customer 16 locate and collect the proper materials for the project.

At step 138, the customer 16 continues to make purchases from merchant 14, as well as from other merchants. At step 140, financial card provider 12 offers the customer 16 a financial incentive to make purchases from merchant 14 rather than from identified competitors of merchant 14. For example, financial card provider 12 may offer the customer 16 a 3% credit for all purchases made from merchant 14 as opposed to a 1% credit for all purchases made from a list of competitors of merchant 14. Financial card provider 12 and merchant 14 may have a suitable arrangement to establish and maintain such a financial incentive system. At step 142, the customer makes purchases from merchant 14, thus receiving the 3% credit from financial card provider 12.

In this manner, personalized customer service may be provided to customers 16 using RFID cards 22. Thus, customers 16 may wish to use RFID cards 22 rather than other cards to make purchases, which may be advantageous to the financial card provider 12 that maintains the accounts 26 for such RFID cards 22. In addition, RFID cards 22 that are affiliated with a particular merchant 14 may provide increased sales to that merchant 14, as customers 16 may wish to use RFID cards 22 affiliated with the merchant 14 in order to get personalized customer service, as well as financial incentives and rewards.

Modifications, additions, or omissions may be made to the method without departing from the scope of the invention. Additionally, steps may be performed in any suitable order without departing from the scope of the invention.

Although an embodiment of the invention and its advantages are described in detail, a person skilled in the art could make various alterations, additions, and omissions without departing from the spirit and scope of the present invention as defined by the appended claims.

What is claimed is:

1. A method of providing personalized customer service, comprising:
   electronically receiving purchase information from a financial card provider system at a merchant data management system from one or more purchases made from a particular merchant using a financial card affiliated with the particular merchant and provided to the customer by a financial card provider associated with the financial card provider system, the financial card provider being distinct from the merchant, the financial card having an associated financial account, the financial card having a radio frequency identification (RFID) device coupled thereto, the RFID device storing identification data identifying the financial account;
   wherein the purchase information includes an identification of items purchased during the one or more purchases;
   determining, at the merchant data management system, a number of loyalty points to be awarded to the financial account based on the purchase information;
   reading, at the merchant data management system, the identification data from the RFID device using an RFID reading device;
   determining, using the merchant data management system, one or more additional items to be purchased;
   generating, at the merchant data management system, personalized service data based on the purchase information, a purchase history, and the number of loyalty points associated with the identified financial account, wherein the personalized service data comprises an offer for a financial incentive tied to the financial account stored at the financial card provider system if the one or more additional items are selected, wherein the one or more additional items are based on purchase information, the purchase history and the number of loyalty points associated with the identified financial account and wherein the offer is an offer received from the financial card provider system and based on an identified merchant competitor; and
   providing the offer to the customer via an electronic visual interface associated with the merchant data management system.

2. The method of claim 1, wherein the financial card is a credit card and the financial account is a credit card account.

3. The method of claim 1, wherein the financial card is only used to make purchases from the particular merchant.

4. The method of claim 1, wherein the financial card is affiliated with the particular merchant and is also used to make purchases from one or more other merchants; and
   the method further comprising offering, the merchant data management system, the customer a financial incentive for making purchases from the particular merchant using the financial card as compared to making purchases from the one or more other merchants using the financial card.

5. The method of claim 1 further comprising offering the customer a discount on particular items based on the identified items purchased during the one or more purchases.

6. The method of claim 5, wherein offering the customer a discount on particular items based on the identified items purchased during the one or more purchases comprises offering the customer a discount on a particular item of which the customer has purchased a predetermined quantity.

7. The method of claim 1, wherein reading the identification data from the RFID device using an RFID reading device at the merchant data management system comprises automatically detecting and reading the identification data from the RFID device when the customer enters the merchants premises.

8. The method of claim 1, wherein the offer based on the competitor is based on a percentage of credit given to the customer from the competitor for purchases made.

9. A system for providing personalized customer service, comprising:
   a purchase information processor of a merchant system that receives purchase information from a financial card provider system, wherein the purchase information is from one or more purchases made from a particular merchant using a financial card affiliated with the particular merchant and provided to the customer by a financial card provider associated with the financial card provider system, the financial card provider being distinct from the merchant, the financial card having an associated financial account, the financial card having a radio frequency identification (RFID) device coupled thereto, the RFID device storing identification data identifying the financial account;
   wherein the purchase information includes an identification of items purchased during the one or more purchases;

a financial reward processor of a merchant system that determines a number of loyalty points to be awarded to the financial account based on the purchase information;

an RFID reading device of a merchant system operable to read the identification data from the RFID device; and a purchase information management processor of a merchant system that:
  determines one or more additional items to be purchased;
  generates personalized service data based on the purchase information, a purchase history, and the number of loyalty points associated with the identified financial account, wherein the personalized service data comprises an offer for a financial incentive tied to the financial account if the one or more additional items are selected, wherein the one or more additional items are based on purchase information, a purchase history, and the number of loyalty points associated with the identified financial account and wherein the offer is an offer provided by the financial card provider system based on an identified merchant competitor; and
  provides the offer to the customer via an electronic visual interface of the merchant system.

10. The system of claim 9, wherein the financial card is a credit card and the financial account is a credit card account.

11. The system of claim 9, wherein the financial card is only used to make purchases from the particular merchant.

12. The system of claim 9, wherein the financial card is affiliated with the particular merchant and is also used to make purchases from one or more other merchants; and
  the system further comprising a financial incentive processor that offers the customer a financial incentive for making purchases from the particular merchant using the financial card as compared to making purchases from one or more other merchants using the financial card.

13. The system of claim 9 further comprising a customer service processor of the merchant system that provides personalized service to the customer by offering the customer a discount on particular items based on the identified items purchased during the one or more purchases.

14. The system of claim 13, wherein the customer service processor offers the customer a discount on a particular item of which the customer has purchased a predetermined quantity.

15. The system of claim 9, wherein the RFID reading device is operable to automatically detect and reading the identification data from the RFID device when the customer enters the merchants premises.

16. A method of providing personalized customer service, comprising:
  electronically receiving, at an account database, purchase information from a financial card provider system, wherein the purchase information is from one or more purchases made from the particular merchant using the financial card affiliated with the particular merchant and provided to the customer by a financial card provider, the financial card provider being distinct from the merchant, the financial card having an associated financial account, the financial card having a radio frequency identification (RFID) device coupled thereto, the RFID device storing identification data identifying the financial account, wherein the purchase information including an identification of items purchased during the one or more purchases;

electronically receiving, at the account database, a determined number of loyalty points to be awarded to the financial account based on the purchase information; and
  transmitting the stored purchase information and loyalty points to at least one processor associated with the merchant to allow the merchant to provide personalized service to the customer tailored to the purchase history information associated with the identified financial account in response to the RFID device being detected and identified as being associated with the financial account, wherein providing personalized experience comprises:
    determining, using the at least one processor associated with the merchant, one or more items to be purchased;
    generating, using the at least one processor associated with the merchant an offer for a financial reward tied to the financial account if the one or more additional items are selected, wherein the one or more additional items are based on the purchase information, a purchase history, and the number of loyalty points associated with the identified financial account and wherein the offer is an offer provided by the financial card provider and based on an identified merchant competitor; and
    providing the offer to the customer via an electronic visual interface associated with the at least one processor.

17. The method of claim 16, wherein the financial card is a credit card and the financial account is a credit card account.

18. The method of claim 16, wherein the financial card is only used to make purchases from the particular merchant.

19. The method of claim 16, wherein the financial card is affiliated with the particular merchant and is also used to make purchases from one or more other merchants; and
  the method further comprising offering, the electronic visual interface, the customer a financial incentive for making purchases from the particular merchant using the financial card as compared to making purchases from the one or more other merchants using the financial card.

20. A system of providing personalized customer service, the system comprising a financial card issuer system, the financial card issuer system including:
  a financial card issuing system that provides a customer a financial card having a radio frequency identification (RFID) device coupled thereto, the financial card being affiliated with a particular merchant and having an associated financial account, the RFID device strong identification data identifying the financial account;
  a purchase history information database that receives electronic purchase information from a merchant system associated with the particular merchant, wherein the electronic purchase information comprises one or more purchases made at the merchant system using the financial card, the purchase information including an identification of items purchased during the one or more purchases;
  a financial rewards processor that determines a number of loyalty points to be awarded to the financial account based on the purchase information; and
  a communication interface that transmits the purchase information and loyalty points to at least one processor associated with the merchant system to allow the merchant to provide personalized service to the customer tailored to the purchase history information associated with the identified financial account, wherein providing personalize service to the customer comprises:
  determining, at the merchant system, one or more additional items to be purchased;
  upon receiving identification data from the RFID device, generating, using the at least one processor associated with the merchant, one or more additional items for the customer and providing an offer for a financial reward tied to the financial account if the one or more items are selected to the customer via an electronic visual interface associated with the merchant system, wherein the one or more recommended items are based on the purchase information, the purchase history information, and the number of loyalty points associated with the identified financial account and wherein the financial reward is a reward offered by the financial card provider and based on an identified merchant competitor.

21. The system of claim 20, wherein the financial card is a credit card and the financial account is a credit card account.

22. The system of claim 20, wherein the financial card is only used to make purchases from the particular merchant.

23. The system of claim 20, wherein the financial card is affiliated with the particular merchant and is also used to make purchases from one or more other merchants; and
  the financial card issuer system further comprises a financial incentives module that offers the customer a financial incentive for making purchase from the particular merchant using the financial card as compared to making purchases from the one or more other merchants using the financial card.

24. A system, comprising:
  a merchant computer system, having a processor; and
  a non-transitory computer readable medium coupled to the merchant computer system, the computer readable medium comprising a program operable, when executed by the processor, to:
    electronically receive purchase information from a financial card provider system, wherein the purchase information is from one or more purchases made from a particular merchant using a financial card affiliated with the particular merchant and provided to the customer by a financial card provider, the financial card having an associated financial account, the financial card having a radio frequency identification (RFID) device coupled thereto, the RFID device sorting identification data identifying the financial account;
    wherein the purchase information includes an identification of items purchased during the one or more purchases;
    determine a number of loyalty points to be awarded to the financial account based on the purchase information;
    read the identification data from the RFID device using an RFID reading device after the customer has selected one or more items to be purchased; and
    provide personalized service to the customer tailored to the purchase history information associated with the identified financial account, wherein providing personalized service to the customer comprises:
      determining one or more additional items to be purchased;
      generating a financial reward tied to the financial account if the one or more additional items are selected, wherein the one or more additional items are based on the purchase information, the purchase history information, and the number of loyalty points associated with the identified financial account and wherein the financial reward is a reward offered by the financial card provider and based on an identified merchant competitor; and
      providing the financial reward to the customer via an electronic visual interface associated with the merchant computer system.

* * * * *